United States Patent [19]

Soleau

[11] Patent Number: 4,624,141
[45] Date of Patent: Nov. 25, 1986

[54] TOWROPE-HANDLING SYSTEM MONITOR FOR WATERSKIING

[76] Inventor: James R. Soleau, P.O. Box 33222, Seattle, Wash. 98133

[21] Appl. No.: 719,074

[22] Filed: Apr. 2, 1985

[51] Int. Cl.⁴ ............................................. B63B 45/04
[52] U.S. Cl. .................................. 73/865.8; 116/26; 242/86.5 A; 340/984
[58] Field of Search ................ 116/DIG. 43, 26, 324; 114/253, 254, 242; 73/432 R, 430 R; 340/901, 984; 242/86.5 A

[56] References Cited

U.S. PATENT DOCUMENTS

| 3,103,005 | 9/1963 | Hills | 114/253 X |
| 3,525,989 | 8/1970 | Fagan | 340/984 X |
| 3,602,188 | 8/1971 | Penaflor | 116/132 |
| 3,964,425 | 6/1976 | Septor, Sr. | 242/86.5 A |
| 4,173,196 | 11/1979 | Casad et al. | 114/253 |
| 4,233,923 | 11/1980 | Casad et al. | 114/253 |
| 4,483,683 | 11/1984 | Alley, Sr. | 114/253 X |

OTHER PUBLICATIONS

Pres:Air:Trol Corp. advertising brochure.

Primary Examiner—Jerry W. Myracle
Attorney, Agent, or Firm—Christensen, O'Connor, Johnson & Kindness

[57] ABSTRACT

A water-skier towrope-handling system is provided that provides an alarm to the driver of a ski towboat when the skier falls. The alarm is triggered by the release of the towrope handle by the skier, independent of the tension on the ski rope. Preferably, a back-up switch is provided that activates the alarm upon contact with the water. The back-up switch is mounted on the towrope in close proximity to the handle assembly to signal the boat driver that the towrope handle assembly is in the water. The monitoring system also provides a tracking system that provides signals to the boat driver of the skier's position relative to the towboat. Preferably, the position indicator is frozen at the time of a fall to indicate the relative position of the skier at the time of the fall to facilitate finding the downed skier. The towrope handling system can also be used to vary the length of the towrope without affecting the action of the alarm and position-monitoring devices.

23 Claims, 15 Drawing Figures

TOWROPE-HANDLING SYSTEM MONITOR FOR WATERSKIING

BACKGROUND OF THE INVENTION

This invention relates to towrope systems for towing water-skiers behind a boat and, more particularly, relates to a tow system that provides a monitor of the skier's position and a warning to the towboat operator if the skier should fall into the water. In a preferred embodiment, the system also provides a readout of the length of rope trailing the boat and allows adjustment of the rope length.

Water-skiing has become a popular pastime for many people and this has led to certain areas becoming very crowded with boats and skiers being towed behind boats. Almost inevitably, every skier at one time or another will fall in the water or release the towrope and sink into the water for one reason or another. Sometimes the rope is accidentally released by the skier; sometimes the rope is yanked from the skier's hand when the skier falters. Since the boat operator must focus his attention on the boat operation in order to avoid hitting other boats and skiers or obstacles, it is difficult for the driver to maintain constant watch on the skier to know exactly if and when a skier releases the rope or falls in the water. While a skier towed behind a boat is, in most cases, easily visible to other boats so that collisions between boats and skiers can be avoided, it is a different matter when the skier falls into the water. The skier then is very difficult to see and, in a crowded water area, the chances of a downed skier being struck by another boat are high. The possibility of serious injury to a downed skier has led most states to require a spotter in the towboat to keep constant watch on the skier. The chances of the skier being hit by another boat are diminished if the skier's own boat operator, immediately upon knowing that the skier has fallen, can double back to where the skier is in the water and eithe pick the skier up in the boat or return the towrope to the skier so that he can be again pulled up into a skiing position. The length of time between the time when the skier goes down and the time that he is located and picked up by the towboat or returned to a skiing position is directly proportional to the time it takes the boat operator to realize the skier has fallen. Therefore, it is advantageous for the boat operator to know immediately that the skier has fallen or released the towrope. Also, since the skier is as hard to see for his own towboat as he is for other boats, when he is down in the water, it would be advantageous for the towboat operator to know the approximate location, with respect to the boat, that the skier was in at the time he released the rope so that the towboat operator would have an approximation of the skier's position in the water, even before the skier was sighted by the boat operator.

Attempts have been made to produce warning devices that signal the fall of a water-skier. One of these is shown in U.S. Pat. No. 3,602,188 and operates on the principle of a mechanism that senses the release of tension in the towrope as an indication that the skier has fallen. While this warning system works on most occasions, it also has drawbacks in that it operates solely on the principle that a skier holding onto the line will cause a tension in the line and that the tension will be released only upon the release of the towrope by the skier. In actual water-skiing practice, particularly in slalom skiing, there are times when the rope will go slack, due to change in direction of the skier or the boat and, therefore, there will be a release of tension in the line even though the skier is still upright on the ski(s) and the tension release is only momentary. In such a situation, it is possible for some of the prior art warning systems to operate indicating that the skier has fallen when, in fact, it was merely a short-term slack in the line that was detected, rather than the actual fall of the skier. The prior art systems also do not provide for automatic play-out or reel-in of the towrope, or a communication ability between a skier and the towboat.

It is therefore advantageous to provide a warning device to the operator of a boat towing a skier that indicates to the operator that the skier has fallen or released the towrope for some reason. It is also advantageous for the boat operator to know the approximate angular position of the skier with respect to the boat at the time the towrope was released to aid the operator in finding the downed skier. It is desirable that the warning to the boat operator be related directly to the grip of the skier on the towrope and independent of the tension on the rope so that momentary slack in the line will not be misdiagnosed as a fall.

SUMMARY OF THE INVENTION

In response to the problems and needs discussed above, the present invention provides a visual and audible warning to the operator of a water-ski towboat that the skier being towed by the boat has released the towline. The warning is provided by sensing the release of a grip on the towline handle independent of tension on the line. The invention also provides an indicator panel for the towboat operator that monitors the angular position of the skier with respect to the towboat and that freezes on the panel the location of the skier at the time that the towrope was released so that when the towrope release warning is sounded the operator can gauge, from the last recorded position of the skier, the approximate place to look for the downed skier to pull him into the boat or to return the towrope to him.

In one embodiment of the invention, the towrope release warning is controlled by an air-pulse switch connected to an air pocket in the tow handle. The towrope handle includes a hollow air chamber that is compressed by the skier when he has gripped the handle and that, when released by the skier, causes an air pulse to travel to the air-pulse switch to activate the alarm and to freeze the position indicator. Alternatively, the electric conductor that runs the length of the towline is connected to an electrical pressure switch mounted in the handle of the towrope, which senses release of the towrope by noting the separation of a set of normally open otherwise engaged contacts in the towrope handle, which, in turn, activate a circuit that sets off a warning buzzer and visual indicator in the towboat. A pushbutton switch can be included in the handle assembly that operates the same buzzer to allow the skier to communicate with the boat drive in coded form.

The invention also includes a novel ball-and-socket commutator used to electrically connect the towrope to the alarm and indicating panel through the reel of a rope winder upon which the towrope is stored and from which it is played out to the skier.

BRIEF DESCRIPTION OF THE DRAWINGS.

The objects and advantages of the present invention will be better understood by those of ordinary skill in the art and others upon reading the ensuing specification when taken in conjunction with the drawings, wherein.

DETAILED DESCRIPTION OF THE PREFERRED EMBODIMENT

Figure 1:
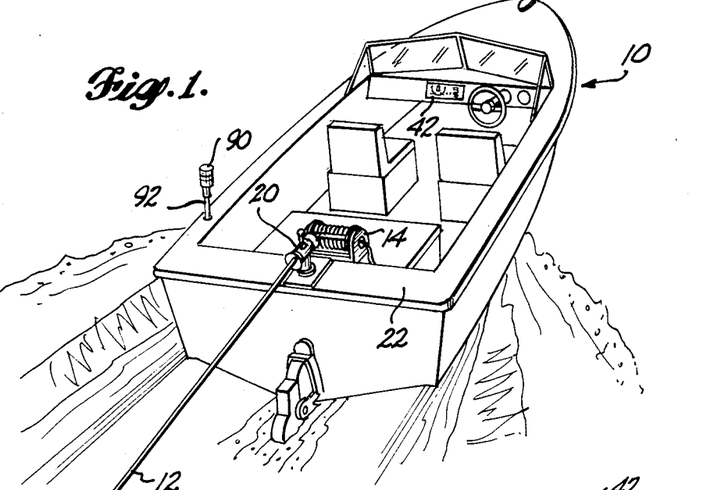
FIG. 1 is an isometric view of a water-ski towboat having a towrope-handling system on board made in accordance with the principles of the present invention.
Figure 2:
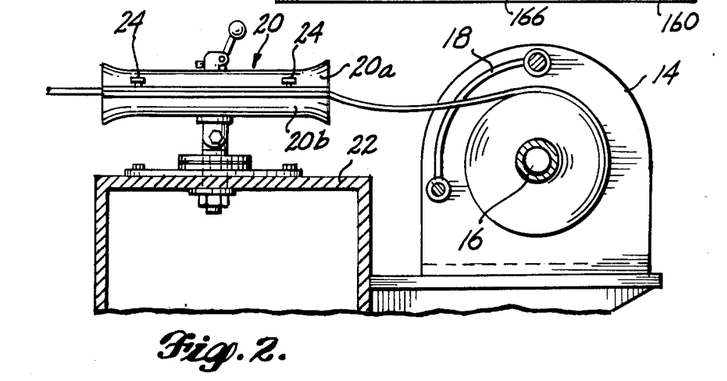
FIG. 2 is a side elevational view of a rope, clamp, and winder system made in accordance with the principles of the present invention.
Figures 3, 4, 6, 7:
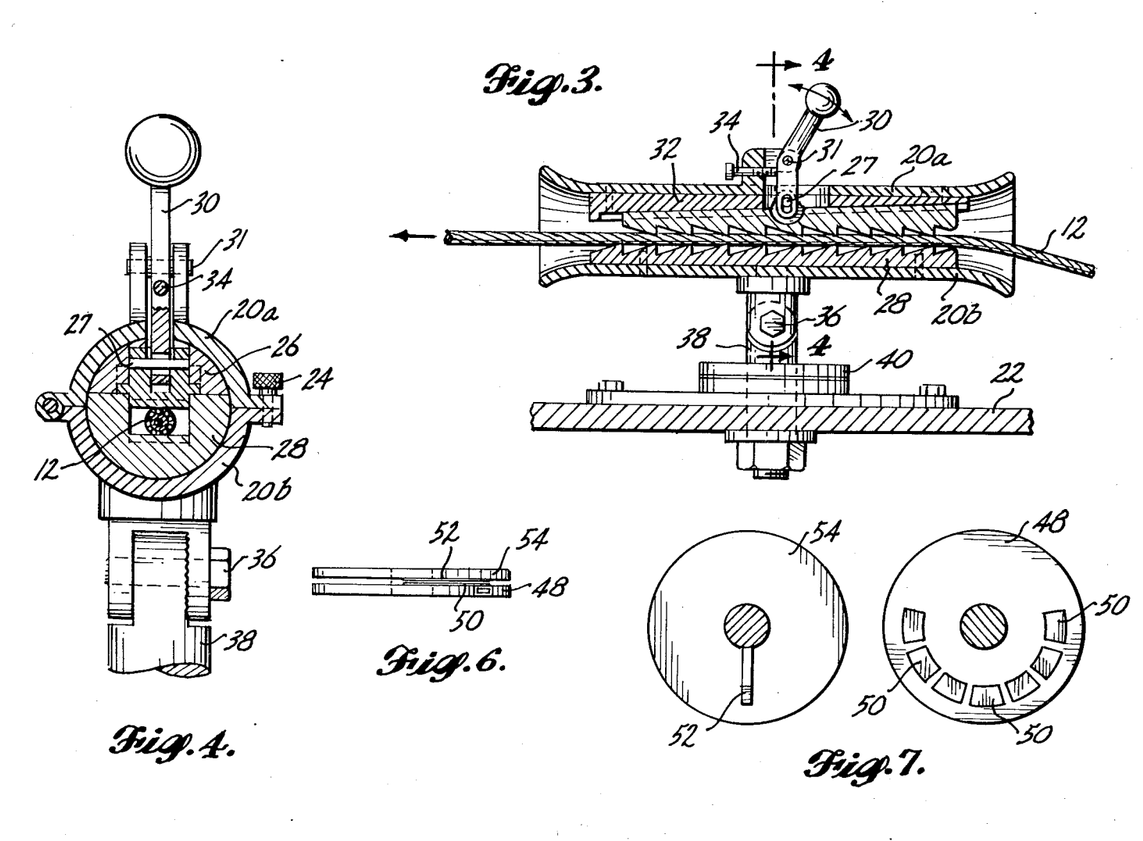
FIG. 3 is a side elevational view in partial section of one embodiment of a rope-clamping device as shown in FIG. 2.
FIG. 4 is an elevational view of the rope-clamping device in partial section along the line 4—4 of FIG. 3.
FIG. 6 is a side elevational view of one embodiment of a water-skier position-tracking device made in accordance with the principles of the present invention.
FIG. 7 is a plan view of the two parts of the tracking device shown in FIG. 6 separated into components.

FIG. 1 shows a powerboat of a type that can typically be used to tow a water-skier. The boat 10 has a cockpit area where the drive and a passenger can sit and has a ski rope 12 trailing behind it. A first end of the ski rope is attached to a winding mechanism 14 on the boat 10. The second end of the towrope 12 has a tow handle assembly attached to it for the skier to grip. The tow handle assembly, while not shown in FIG. 1, will be described in greater detail below. FIG. 2 illustrates in more detail the towrope attachment system mounted on the aft end of the boat 10 shown in FIG. 1. The rope 12 is wound on the reel 16 of a winding mechanism 14, such as a power winch, preferably with a level winder 18 conventionally mounted thereon to keep the rope 12 levelly wound on the reel 16. The power winch can be any of several conventional power winches, except for some details of construction that will be described in greater detail later on. From the winch, the rope 12 passes through a releasable gripping mechanism that includes a tubular member 20 pivotally mounted on the transom 22 of the boat. The tubular member 20 has a clamp arrangement therein that releasably clamps the rope 12, permitting the boat 10 to tow the skier without slippage of the rope and without putting strain on the power winch, while at the same time being easily releasable to allow the rope to either be wound in or let further out. One embodiment of the rope-clamping system is shown in greater detail in FIGS. 3 and 4 and it can be seen that the tubular member 20 consists of an upper section 20a and a lower section 20b of semicircular cross section, hingedly attached along one edge and releasably held such as by thumbscrews 24 along the second edge so that the top half 20a of the tube can be opend to allow the rope 12 to be laid inside the tube without the necessity of having to thread it through the tube. The rope 12, when inside the tube 20a, is gripped by cooperating upper and lower rubber toothed grippers, 26 and 28, respectively, that run the length of the tube. The elongate rubber grippers spread the compressive force along the length of the rope 12 and therefore avoid kinking or constriction of any portion of the rope that might occur if point pressure were applied by the grippers. This is important, as will be discussed later, because the rope 12 is intended to carry within it an air tube or electrical conducting wires to operate a "skier up/down" alarm system or skier communication system in accordance with the principles of the present invention, as will be described below. The upper gripper 26 is controlled by a lever 30 that pivots about a pin 31 in the plane perpendicular to the axis of the boat 10. The lever 30 is connected to the upper gripper 26 by a pin 27 and drives the upper gripper against a wedge 32 between the upper gripper 26 and the upper portion 20a of the tube 20 to force the upper gripper 26 toward the lower gripper 28 to clamp the rope 12, when the lever 30 is pivoted clockwise, as shown in FIG. 4. The upper gripper 26 is forced to the right, thereby releasing the pressure between the two grippers, when the lever 30 is moved counterclockwise, thus allowing the rope to be moved longitudinally through the tube 20. A set screw 34 is adjustable to abut the lever 30 and vary the amount of pressure that can be placed on the rope 12 by limiting the travel of the lever 30 in the clockwise direction. The entire tube 20 is pivotable in a vertical plane about a mounting pin 36 that runs horizontally through the shaft 38 of the gripper mount. The tube 20 is also pivotable in a horizontal plane to allow the tube 20 to follow the skier as the skier moves laterally with respect to the towboat 10. A tracking mechanism 40 is mounted to the shaft 38 of the gripper mount so that it rotates with the shaft 38 and feeds signals back to an indicator on the dashboard of the boat, indicating the angular position of the shaft and, thereby, in turn, the position of the skier with reference to the boat.

Figure 5:
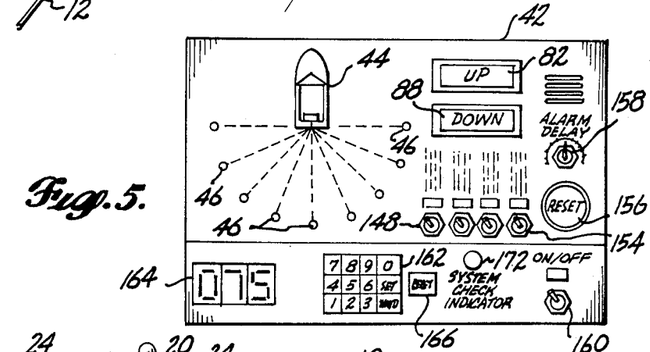
FIG. 5 is a front elevational view of a control and indicator panel for the tow system shown in FIG. 1.

A display panel 42 that can be used with the ski rope handling and monitoring system of the present invention is shown in FIG. 5 and includes in the upper left corner a portion that shows an image 44 of a boat and has a series of indicator lamps 46 arranged in a semicircle around the rear of the boat image 44 to indicate different angular positions of the skier with reference to the boat. In the illustrated embodiment, there are nine indicator lights 46; however, that number is simply exemplary and is not intended to limit the invention. The exact number of indicator lamps in any environment will be determined by the user. In the illustrated embodiment of the invention, a position monitor device is mounted within the housing 40 of the towrope tube 20 mount to send signals to the display panel 42, to illuminate the indicator light 46 corresponding to the angular position of the skier. Also, in the preferred embodiment, if the skier falls, the light 46 indicative of the skier's angular position at the time the skier falls will remain illuminated to indicate to the boat operator the angle at which the skier went down, to facilitate locating the skier.

One example of a system that can be used for the monitoring function of the skier position is shown in FIGS. 6 and 7, and includes a first bottom plate 48 that contains a series of electrical conductive areas 50, each corresponding to one of the lamps 46 on the display panel 42. An electrical wiper contact 52 is located on an upper plate 54 and the plates 48 and 54 are superposed to provide contact between the wiper 52 and one of the conductive areas 50 on the lower plate 48. As the skier moves from side to side, the tube 20 pivots in a horizontal plane, carrying with it the upper plate 54 that moves in unison with the shaft 38. As the plate 54 rotates, the wiper 52 contacts different ones of the conductive arms 50 on the bottom plate 48, thereby sending corresponding signals to the indicator panel 42 to illuminate the correct light 46. As mentioned earlier, the circuit is arranged so that, upon the skier going down, a signal is sent to the control circuitry connected to the display panel 42 that freezes the indicator light 46 in the illuminated position at the time that the skier went down. The control circuitry will be discussed in greater detail below. The indicator lamps 46 on the panel can be any suitable lamps, e.g., incandescent lamps or light-emitting diodes, depending on the type of circuitry that is being employed.

Figures 8, 9, 10, 11, 12:
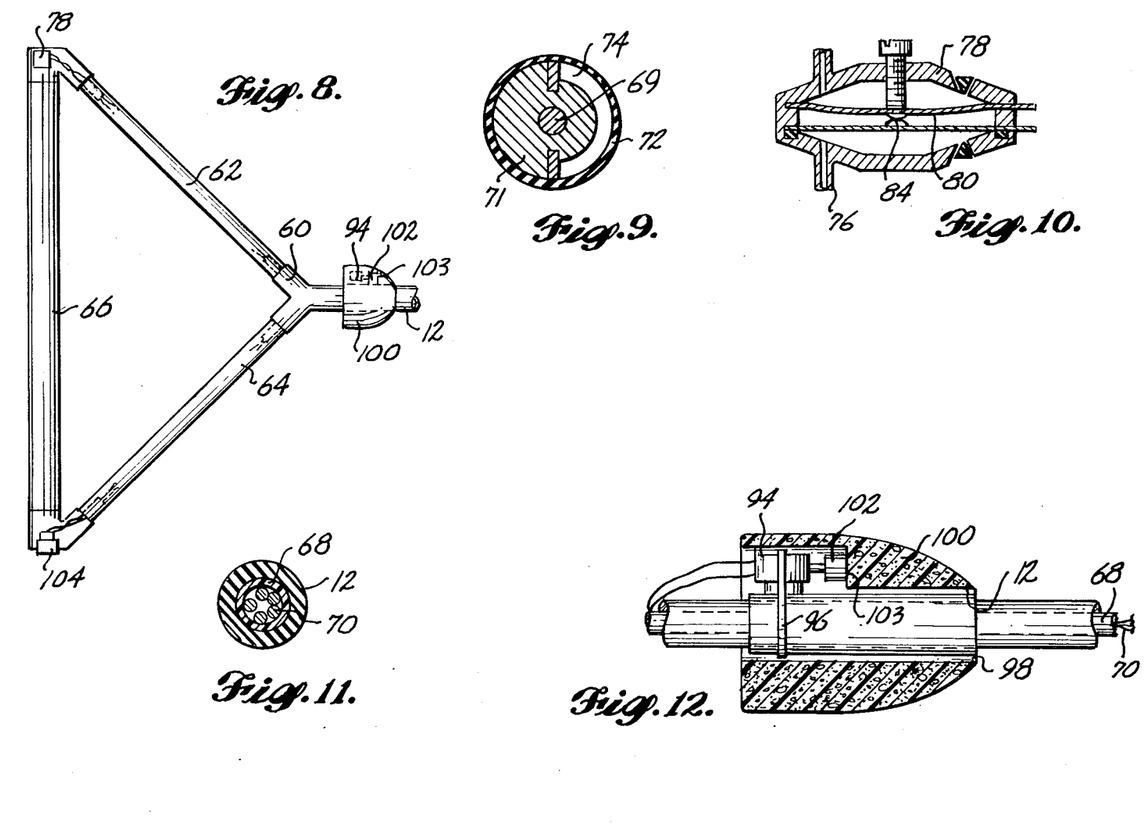
FIG. 8 is a plan view of one embodiment of a ski towrope handle assembly made in accordance with the principles of the present invention.
FIG. 9 is a cross-sectional view of a portion of the tow handle assembly of FIG. 8.
FIG. 10 is a side elevational view in partial section of an airpulse switch used in the tow system of the present invention.
FIG. 11 is a cross-sectional view of a towrope made in accordance with the principles of the present invention.
FIG. 12 is a side elevational view in section of a warning switch that can be used with the towrope-handling system of the present invention.

FIG. 8 illustrates a ski tow handle assembly made in accordance with the principles of the present invention. The tow handle assembly illustrated is of normal configuration as far as the rope 12 being connected to a Y-shaped yoke 60, having two rope sections 62 and 64 coming from it, and then having a rigid handle portion 66 connected across the ends of the rope sections 62 and 64 to form a substantially triangular arrangement for the handle assembly. As shown in FIG. 11, which is a cross section of the towrope 12, the towrope has a liner 68 of PVC or some other moisture-resistant plastic running through its center and a group of electrical conductors running down the liner 68 the length of the towrope into the handle assembly. Several electrical switches are associated within the tow handle assembly to perform various functions in accordance with the invention. A major feature of the invention is to give an indication to the boat operator when the skier releases the tow handle or is down, whether the tow handle is released or not. FIG. 9 shows a cross section of one possible configuration for the rigid handle member 66. The handle member 66 includes a rod 69 that is centrally located within a center member 70 that is the composite of two semicylindrical portions, one of larger diameter than the other. The center member 70 is surrounded by a cylindrical flexible cover 72 that defines a chamber 74 of semi-annular cross section between the cover 72 and the center member 70. In one embodiment of the invention, the chamber 74 communicates with the input 76 to an air-pulse switch 78 shown in FIG. 10, so that changes in air pressure within the chamber 74 of the handle member 66 cause movement of a diaphragm 80 in the air-pulse switch 78, thereby changing the state of the switch from open to closed, or vice versa, depending on the connection. In the illustrated embodiment, when a skier grips the handle member 66, the air pressure within the chamber 74 will be at a certain value and in that position the switch 78 is connected so that the switch is in the open state. This will send a signal to the control panel 42 that lights an "up" indicator light 82, meaning that the skier is up and gripping the handle member 66. If the skier releases the handle member 66 because he falls down or is in trouble, the air pressure within the chamber 74 will change, thereby causing the diaphragm 80 of the air-pulse switch to move to its normally closed state of the switch contacts 84 and 86 and sending a signal to the control panel 42 lighting a "down" indicator 88, indicating that the skier is down.

Preferably, there is also an audible alarm that sounds to catch the attention of the driver, in case he is not watching the panel 42. Since, at times, it is necessary for the skier to release the handle member 66, particularly if doing trick maneuvers, in a situation in which the skier is not in trouble, a time delay is provided so that the grip on the handle member 66 must be released for a predetermined period of time before the alarm will sound. An alarm delay means is provided to vary the delay time between release of the handle member 66 and sounding of the alarm. The delay means can be set in accordance with the skill level of the skier on an empirical basis by the boat operator. The warning signal from the switch 78 is also channeled to circuitry to illuminate a light 90 mounted on a mast 92 mounted on the boat 10, visible to other boats, to indicate that the skier being towed by that boat is down. While a visible light signal is provided in the illustrated embodiment, other visible signals could be used to warn other boats, for example, a pop-up flag could be used that is deployed at the "skier down" signal, or some other signal means.

Alternative to using the air-pulse switch 78 shown in FIG. 10, an electrical switch or relay could be used and the handle member 66 could be built to provide electrical switching directly without the use of an intervening air-pulse switch. For example, the surfaces on the interior of the chamber 74 opposite one another could be electrically conductive and connected to wires running to a relay in the control circuitry. Upon gripping the handle member 66, the flexible outer wall 72 of the handle member 66 is brought into contact with the surface of the central member 70. Since each of these surfaces is electrically conductive, their contact closes the normally open contacts of a switch. When the handle member 66 is released by the skier, the flexible outer wall 72 resumes its semicircular shape spaced from the central member 70, thereby opening the switch contacts, sending a signal to the control circuitry causing the alarm to sound. Again, the alarm delay means would be used in conjunction with the switch to provide for a variable delay between the time the handle member 66 was released and the time that the alarm was activated.

Since there are occasions where a skier will fall down and still remain hanging onto the tow handle, but nevertheless be in trouble, a backup switch is preferably provided that activates when the rope hits the water, regardless of whether the skier is or is not hanging onto the handle. One such switch is illustrated in FIG. 8 at the juncture of the towrope 12 with the handle yoke 60. The switch is shown in greater detail in FIG. 12. A waterproof, spring return, momentary contact switch 94 is connected to the rope 12 by a collar 96 that surround the towrope 12. A mass 100 of polyurethane or other flotation material surrounds a sleeve 98 around the rope 12 and encapsulates the switch 94 to provide flotation, much like a cork or bobber. The mass 100 is able to slide in relation to the rope 12. A plunger 102 associated with the switch 94 abuts an interior wall 103 that defines a space within the mass containing the switch 94. When the skier drops the rope or falls so that the rope hits the water, the mass 100 will move with respect to the rope in a direction toward the handle. The switch 94 will not move since it is affixed to the rope 12. Therefore, the mass 100 will force the plunger 102 to activate the switch, causing the "skier down" light to illuminate and the alarm to sound. When the skier is up out of the water, a return spring in the switch 94 will push the plunger out against the wall 103, thereby moving the mass 100 and changing the state of the switch. Since the rope will hit the water when it is released by the skier and the rope will also hit the water when the skier falls, even if he remains gripping the handle member 66, the switch 94 can be used in conjunction with the gripper switch on the tow handle member 66, or separately, to provide a warning indication of the skier being in trouble as gauged by the contact of the towrope 12 with the water.

In a preferred form of the invention, a communication system is provided between the skier and the boat operator by means of a pushbutton switch 104 mounted on one end of the tow handle member 66. The pushbutton switch is connected to a buzzer or other indicator means on the control panel 42 and by pressing the button the skier can cause the buzzer to buzz or a light to light and, thereby, send signals in some coded form to the boat operator. All of the wires utilized to activate the various switch functions can be run directly through the center core of the towrope encased in a PVC or other flexible, water-impermeable material as shown in FIG. 11.

Figure 13:
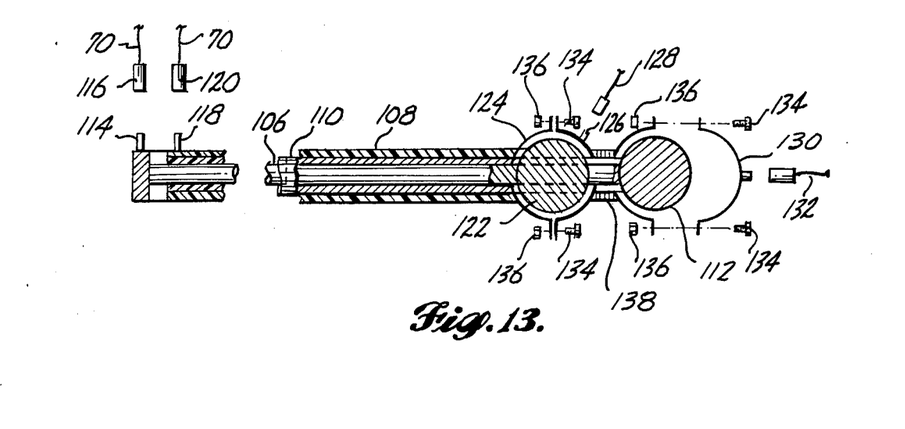
FIG. 13 is a side elevational view in partial section of a ball-and-socket commutator utilized in the rope winder of FIG. 1.

As was discussed earlier, the winch 14 shown in FIGS. 1 and 2 can be any winch or winder, power driven or manual suitable to handle the gauge of rope 12 and fit on the boat. The winch 14, however, must be modified to accept electrical connections from the towrope 12 and pass the electrical signals to the indicator panel 42 and control circuitry. One means for making an electrical rotative connection in the winch is shown in FIG. 13. The shaft upon which the rope is wound consists of two electrically conductive shafts 106 and 108, one concentrically within the other, separated by an insulating spacer 110. The inner shaft 106 has a ball 112 integrally formed on one end that is necessarily conductive along with the shaft. A male electrical terminal 114 extends from the inner shaft through an opening in the outer shaft insulated from the outer shaft. One of the wires 70 extending from the end of the rope 12 has a female connecter 116 electrically affixed thereto, which mates with the male connector 114 to provide a continuous circuit from the wire 70 to the inner shaft 106 and, therefore, to the ball 112 at the end of the inner shaft. Similarly, a male electrical connector 118 extends from the outer shaft 108 and is mated with a female connector 120 connected to another of the wires 70 from the rope 12 to provide an electrical connection between the wire 70 and the outer shaft 108. The outer shaft 108 has a spherical member 122 integrally formed with it, a hole being formed through the center of the spherical member 122 through which the inner shaft 106 passes, the inner shaft 106 being insulated from the spherical member 122. The spherical member 122 at the end of the outer shaft 108 is contained within an outer spherical assembly 124. The space between the spherical member 122 and the outer spherical assembly 124 is filled with a conductive grease that lubricates the bearing surface between the spherical member 122 and outer spherical assembly 124, and also conducts electricity from the spherical member to a connector 126 that passes through the wall of the outer spherical assembly. The connector 126 also serves as a grease port for future lubrication. A wire 128 is connected to the electrical connector 126, and runs to the control circuitry to operate the alarm or communication functions. Similarly, the ball 112 at the end of the inner shaft is contained within a spherical bearing member 130 of a conductive material and filled with conductive grease so that the spherical bearing member 130 is in electrical contact with the wire 70 coming from the towrope 12 and connected to the inner shaft section 106. An electrical connection is made between a wire 132 and the spherical bearing member 130, the wire 132 leading back to the control circuitry to operate the communication or monitoring functions of the device. Preferably, both the outer spherical assembly 124 and the spherical bearing member 130 are of two-piece construction held together by bolts 134 and nuts 136 that permit their separation and repair and reassembly. A nonconductive spacer member 138 separates the outer spherical assembly 124 from the spherical bearing member 130 to prevent a short between the two communication lines. In this manner, a spherical commutator assembly is provided, allowing connection of wires 70 from the rope 12 to the control circuitry through the shafts of the rope winder. The spherical electrical connection described permits 360° of rotation of the winder shaft while maintaining electrical connection between the wires in the rope and the control circuits and display panel.

Figure 14:
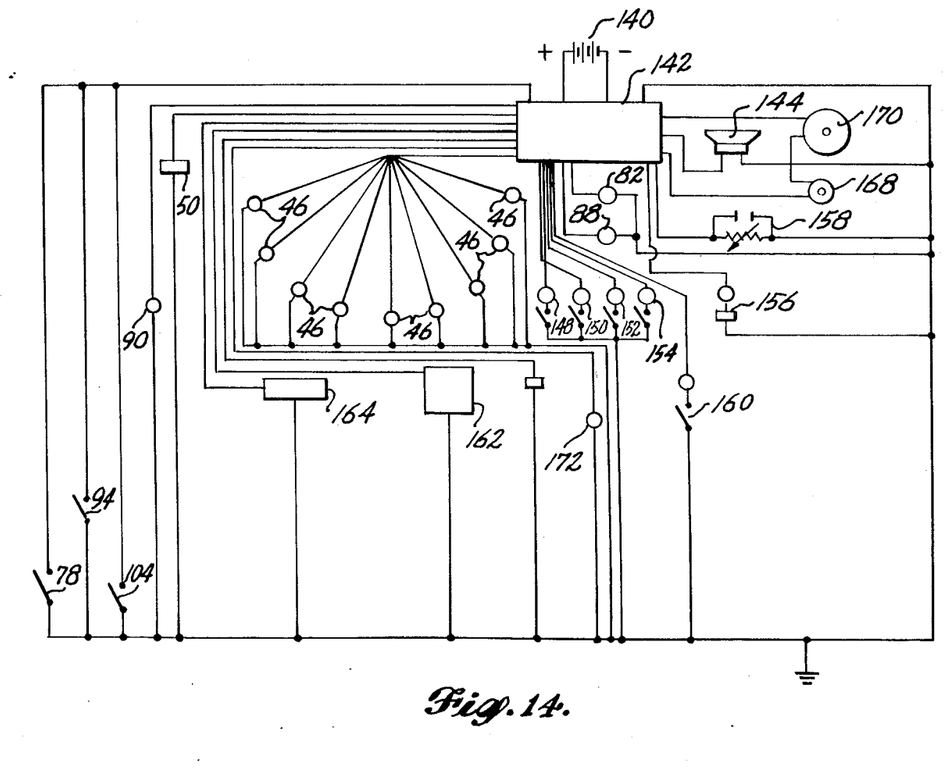
FIG. 14 is a schematic diagram of one embodiment of an electrical system for use in connection with the ski towrope-handling system of the present invention.

FIG. 14 illustrates one embodiment of an electrical circuit that can be utilized to accomplish the features of the present invention. Because of the use of the system on a boat, the system preferably is battery operated and a battery 140 is connected to a power supply that provides the necessary control voltages to operate the system, depending on the configuration used. The control logic 142 can either be microprocessor based or can be made of discrete components and is connected to the various switching devices to provide signals to activate the various monitors and alarms in response to the state of the various switches. The logic circuitry can be developed by an engineer skilled in the art from existing components. In the illustrated embodiment, a speaker 144 is included to provide an audible signalling means for both the alarm and communication functions of the device. An illumination device is provided in conjunction with the speaker 144 to provide a "skier down" visible indicator 88, a "skier up" indicator 82, and is also connected to the light 90 on the mast 92 at the side of the boat 10 to provide an indication to other boats. Lighted switches are provided to turn the various monitoring and alarm systems on and off and, as indicated in FIG. 5, comprise the tracker on/off switch 148 that controls operation of the angular position-monitoring system, the spotter on/off switch 150 that controls operation of the "skier up/down" warning system, the communications on/off switch 152 that controls the communication pushbutton switch 104 on the tow handle, and the light pole on/off switch 154 that controls the operation of the light mast mounted on the boat. A pushbutton reset switch 156, also illuminated, is provided for silencing the alarm and resetting the system. A variable RC circuit 158 is provided as the alarm delay, as described earlier. Another illuminated switch 160 for the autowinder function is provided. This switch is used in conjunction with the rope winder if an autowind reel is used, so that the system can be used to automatically play out or pull in a predetermined length of towrope. A keyboard 162 is provided to set the length of rope desired and a digital indicator 164 is connected in conjunction with the autowinder to provide an indication of the length of towrope depolyed. The release switch 166 releases a clutch 168 on the winder to permit the winder motor 170 to operate. A system check indicator 172 is provided that is illuminated when the clamping mechanism on the towrope-clamping tube 20 is engaged, so that the winder motor 170 will not be operated with the rope 12 clamped. When the rope is unclamped, the indicator 172 will go off, indicating that the system is then ready to either feed out or pull in line.

Figure 15:
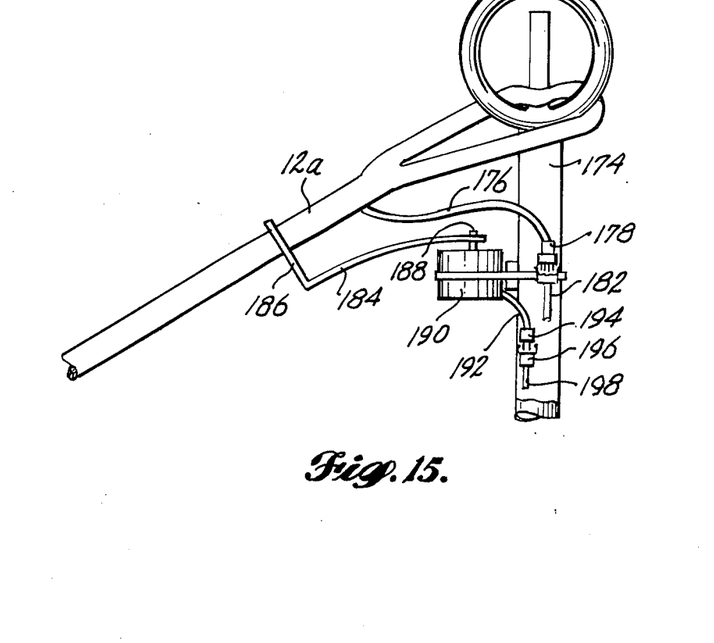
FIG. 15 is a side elevational view of an alternative embodiment of a water-skier position-tracking system made in accordance with the present invention.

FIG. 15 illustrates an alternative embodiment of a rope connection system used to connect the towrope to the boat 10 and to provide electrical connections from the towrope to the control circuitry and indicator panel 42. Referring to FIG. 15, a stationary cleat 174 is mounted on the boat 10. A towrope 12a is connected to the cleat 174, either with a loop at the end, or some other convenient configuration. The bundle 176 of wires from the towrope 12a that leads from the tow handle is terminated in a plug 178 that mates with a second plug 180 mounted on the side of the cleat 174. A bundle 182 of wires from the second plug 180 leads to the control logic and control panel 42. An arm 184 is connected to a collar 186 that encircles the towrope 12a so that the arm 184 tracks the angular motion of the towrope 12a from side to side. The arm 184 is affixed to a shaft 188 that is part of a position indicator assembly 190 mounted on the cleat 174. The position indicator assembly 190 can be an encoder, inductosyn or wafer arrangement, as was shown in FIG. 6, and is utilized to track the angular motion of the flexible arm 184 that, in turn, tracks the angular position of the towrope 12a. The position indicator assembly 190 is electrically connected to the logic circuitry by means of a bundle 192 of wires that terminates in a plug 194 and that in turn mates with a plug 196 mounted on the side of the cleat 174. A bundle 198 of wires from plug 196 leads to the control circuitry. In the embodiment shown in FIG. 15, there is no autowind function and the towrope 12a has to be manually tied off at the desired length.

One of ordinary skill in the art can see that a rope-handling system for a water-skier is provided that permits the operator of the boat to have an immediate indication of the release of the tow handle at one end of the rope by the water-skier. In a preferred form of the invention, an indication is also provided if the rope is dropped into the water. In conjunction with the indication to the driver of the status of the skier, that is, either up or down, the invention also provides a tracking of the angular position of the skier with reference to the boat and freezes the position indicator if the skier releases the tow handle. The warning indicator is operated as a function of the grip or release of the tow handle by the skier and is not dependent on tension on the rope. The alarm will function if the skier releases the tow handle, whether the rope is slacked or under tension. A warning device can also be used that alerts other boats that a skier is down. The invention can be utilized in conjunction with an autowind feature that permits automatic play-out or take-in of the ski rope and an indication of the length of rope trailing the boat. In one form of the invention, a switch is provided on the tow handle that permits the skier to communicate by code with the boat operator.

It will be understood by those of ordinary skill in the art and others that several changes can be made in the illustrated and described embodiment, while remaining within the spirit and scope of the present invention. For example, the precise type of indicator used in the control panel is not critical to the invention. Neither is the precise means for monitoring the angular position of the skier with regard to the boat and any suitable device, e.g., an inductosyn or rotary encoder can be used in place of the wiper arm embodiment described and illustrated herein. While the spherical commutator disclosed herein is felt to be unique, a more standard type of ring commutator could be used in conjunction with the rope winder to provide electrical connection between the wires within the towrope and the control panel. Because of the many changes that can be made to the illustrated embodiment, the invention should be described solely by reference to the appended claims that follow.

The embodiments of the invention in which an exclusive property or privilege is claimed are defined as follows:

1. A device for monitoring the status of a water-skier being towed by a rope from a boat, comprising:
    warning means mounted on the boat;
    tow handle means attached to said rope, said tow handle means including actuation means gripped by said skier and responsible to release of the grip of the skier to produce a warning signal;
    first transmission means linking said actuation means to said warning means to transmit said warning signal from said actuation means to said warning means, said warning signal being independent of the tension on said rope, said first transmission means including at least one electrical conductor running the length of said towrope from said tow handle to said boat; and
    a continuous sleeve of flexible, waterproof material running the length of said towrope, said electrical conductor being surrounded by said sleeve.

2. The device of claim 1, wherein said warning means includes a visible indicator means and an audible indicator means in proximity to the driving station of said boat.

3. The device of claim 2, further including a boat-warning means mounted on the hull of said boat visible to the surrounding area.

4. The device of claim 3, wherein said boat-warning means comprises a mast mounted on said boat hull and an electric lamp mounted atop said mast.

5. The warning device of claim 3, wherein said boat-warning device includes a flag means carried on a mast in stowed postion, said flag means being responsive to the warning signal from said actuation means to unfurl to a visible state.

6. The device of claim 1, further including a reel means upon which said towrope is wound, said reel means including electrical connection means for connection said at least electrical conductor to said warning means.

7. The device of claim 1, wherein said tow handle means includes:
    a rigid inner member having at least a portion of its outer surface electrically conductive; and a flexible outer member spaced from said inner member and having a first surface facing said outer surface of said inner member, at least a portion of said first surface being electrically conductive, said outer member being resiliently deformable to place said conductive portion of said first surface into contact with said conductive portion of said outer surface.

8. The device of claim 1, wherein said transmission means comprises a plurality of electrical conductors located within the center of the towrope.

9. The device of claim 1, further including:
a switch means mounted on said tow handle, independent of said actuation means, selectively operable by the skier to produce a communication signal; and
a communications indicator mounted on the boat responsive to said communication signal.

10. The device of claim 9, wherein said communication indicator and said warning means are integral.

11. A system for controlling a water-ski towrope being towed behind a boat comprising:
a winder mounted on said boat for holding the towrope;
a length monitor means for providing a first signal indicative of the length of rope unwound from said winder;
a length selection means for producing a second signal indicative of the desired length of rope to be unwound from said winder; and
comparison means for comparing said first and second signals and producing a stop signal when said first and second signals are equal.

12. The system of claim 11, further including:
a power winch operable in response to said second signal to reel in or play rope and operable in response to said stop signal to cease reeling in or playing out rope.

13. A tracking system for monitoring the position of a skier being towed by a rope behind a boat comprising:
tracking means mounted on said boat associated with the rope for producing a first signal indicative of the angular position of the skier relative to the boat; and
position read-out means responsive to said first signal for providing a visual indication of said skier position.

14. The system of claim 13, wherein said tracking means moves in unison with the lateral movement of said rope.

15. The system of claim 14, further including release-indicating means for producing a second signal indicative of the release of the towworope by the skier, said position read-out means responsive to said second signal to freeze the visual indication of skier position at the value at the time of reception of the second signal.

16. A device for monitoring the status of a water-skier being towed by a rope from a boat, comprising:
warning means mounted on the boat;
tow handle means attached to said rope, said tow handle means including actuation means gripped by said skier and responsive to the release of the grip of said skier to produce a warning signal, said tow handle means including a handlebar, said handlebar having a rigid portion and a flexible wall portion mounted on and spaced from said rigid portion, said flexible wall portion defining a closed chamber between said rigid portion and said flexible wall portion, said flexible wall portion being resiliently deformable by the grip of said skier to produce a certain fluid pressure within the chamber defined by said wall portion;
fluid pulse sensing means in fluid communication with said chamber defined by said flexible wall means to sense a change in fluid pressure within said closed chamber upon the release of the grip of said skier and in electrical communication with said warning means; and
first transmission means linking said actuation means to said warning means to transmit said warning signal from said actuation means to said warning means, said warning signal being independent of the tension on said rope.

17. The device of claim 16, wherein said pulse-sensing means comprises an air-pulse switch having a fluid inlet port connected to said chamber defined by said flexible wall portion, wherein a change in air pressure within said chamber changes the state of said air-pulse switch.

18. A device for monitoring the status of a water-skier being towed by a rope from a boat, comprising:
warning means mounted on the boat;
actuation means gripped by said skier and responsive to release of the grip of said skier to produce a warning signal;
first transmission means linking said actuation means to said warning means to transmit said warning signal from said actuation means to said warning means, said warning signal being independent of the tension on said rope; and
tracking means associated with said ski-rope for monitorin the angular position of said skier with relation to said boat and producing a position indicating signal and position readout means mounted in said boat responsive to said position indicating signal for providing a visible indication of the relative position of said skier to said boat.

19. The device of claim 18, wherein said tracking means includes a rope holder through which said towrope passes, said rope holder being rigidly mounted to a shaft, said shaft being pivotally mounted to said boat and further including pick-off means associated with said shaft to monitor the angular position of said shaft and produce said positoin signal.

20. The device of claim 19, wherein said rope holder includes clamping means operable to hold said rope within said rope holder, said clamping means being constructed and arranged to evenly applying clamping pressure over the length of said rope holder.

21. The device of claim 19, wherein said pick-off means includes:
a first disc affixed to said transom, said first disc having a plurality of discrete conductive areas formed on a first surface thereof,
a second disc affixed to said shaft, said second disc having an electrically conductive wiper formed on a first surface thereof, said first and second discs being superposed with their respective first surfaces facing one another, said wiper selectively contacting each of said conductive areas as said shaft turns.

22. A device for monitoring the status of a water-skier being towed by a rope from a boat, comprising:
warning means mounted on the boat;
actuation means gripped by said skier and responsive to release of the grip of the skier to produce a warning signal;

first transmission means linking said actuation means to said warning means to transmit said warning signal from said actuation means to said warning means, said warning signal being independent of the tension on said rope, said first transmission means including at least one electrical conductor running along the length of said rope from said tow handle to said boat;

reel means mounted on said boat upon which said towrope is wound, said reel means including electrical connection means for connecting said at least one electrical conductor to said warning means, said electrical connection means including a first plug means electrically affixed to said reel, a second plug means electrically affixed to said conductor and adapted to mate with said first plug means, a conductive sphere integrally formed with said reel, in electrical communication with said first plug means, a conductive sperical bearing means substantially encasing said sphere and in electrical communication with it, a third plug means electrically connected to said spherical bearing, and second transmission means electrically connecting said third plug means to said warning means.

23. A device for monitoring the status of a water-skier being towed by a rope from a boat, comprising:

warning means mounted on the boat;

tow handle means attached to said rope, said tow handle means including actuation means gripped by said skier and responsive to release of the grip of the skier to produce a warning signal;

first transmission means linking said actuation means to said warning means to transmit said warning signal from said actuation means to said warning means, said warning signal being independent of the tension on said rope; and second actuation means mounted on said towrope adjacent said handle means for producing said warning signal upon entry of said second actuation means into the water.

* * * * *

UNITED STATES PATENT AND TRADEMARK OFFICE
CERTIFICATE OF CORRECTION

PATENT NO. : 4,624,141

DATED : November 25, 1986

INVENTOR(S) : James R. Soleau

It is certified that error appears in the above-identified patent and that said Letters Patent is hereby corrected as shown below:

```
Column 1, line 40, "eithe" is changed to --either--
Column 2, line 59, "drive" is changed to --driver--
Column 3, line 50, "drive" is changed to --driver--
Column 4, line 13, "opeend" is changed to --opened--
Column 6, lines 65-66, "surround" is changed to --surrounds--
Column 9, line 9, "depolyed" is changed to --deployed--
Column 10, line 31, "responsible" is changed to --responsive--
           line 56, "postion" is changed to --position--
Column 11, line 36, "play rope" is changed to --play out rope--
           line 53, "towworope" is changed to --towrope--
Column 12, line 33, "monitorin" is changed to --monitoring--
           line 45, "positoin" is changed to --position--
```

Signed and Sealed this

Eighteenth Day of August, 1987

*Attest:*

*Attesting Officer*

DONALD J. QUIGG

Commissioner of Patents and Trademarks